(12) United States Patent
McCarthy et al.

(10) Patent No.: US 7,652,791 B2
(45) Date of Patent: Jan. 26, 2010

(54) REPRINTING

(75) Inventors: Ann L. McCarthy, Lexington, KY (US); Edul N. Dalal, Webster, NY (US); Wencheng Wu, Webster, NY (US); Dale R. Mashtare, Bloomfield, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 589 days.

(21) Appl. No.: 11/488,355

(22) Filed: Jul. 18, 2006

(65) Prior Publication Data

US 2007/0268502 A1 Nov. 22, 2007

Related U.S. Application Data

(60) Provisional application No. 60/800,713, filed on May 16, 2006.

(51) Int. Cl.
G06F 3/12 (2006.01)

(52) U.S. Cl. .......................... 358/1.9; 358/406; 358/504

(58) Field of Classification Search ................ 358/406, 358/504, 1.1, 1.9, 3.24, 500, 501, 518, 400, 358/401, 448, 296
See application file for complete search history.

(56) References Cited

U.S. PATENT DOCUMENTS

| 6,048,117 | A  | 4/2000 | Banton |
| 6,178,007 | B1 | 1/2001 | Harrington |
| 6,222,648 | B1 | 4/2001 | Wolf et al. |
| 6,384,918 | B1 | 5/2002 | Hubble, III et al. |
| 6,441,923 | B1 | 8/2002 | Balasubramanian et al. |
| 6,538,770 | B1 | 3/2003 | Mestha |
| 2004/0012817 | A1 | 1/2004 | Brewington et al. |
| 2004/0190061 | A1* | 9/2004 | Yamaguchi ................ 358/1.16 |
| 2005/0073731 | A1 | 4/2005 | Deer et al. |
| 2006/0034631 | A1 | 2/2006 | Lofthus et al. |

OTHER PUBLICATIONS

U.S. Appl. No. 11/320,263, filed Dec. 22, 2005, Eschbach, et al.

* cited by examiner

*Primary Examiner*—Thomas D Lee
(74) *Attorney, Agent, or Firm*—Fay Sharpe LLP (57) ABSTRACT

Consistency of document reprints is improved by recording characteristics of a reference printing system used to produce a reference printing of a document, determining related characteristics of a reprint printing system, retrieving the recorded characteristics and compensating for differences between the reference system and the reprint system in the reprint system prior to using the reprint system to produce reprints of the document. Analytical test prints (TPs) are produced with the respective printing systems in close temporal association to the production of the respective reference prints and reprints. TPs can be customized according to aspects of the document. TP customization allows the compensation to address aspects of the printing systems that have a bearing on perceived consistency in the reprints. TPs can be customized with regard to colors in test patches or both the colors and locations of test patches on a page. Compensation is based on measurements of the TPs.

26 Claims, 3 Drawing Sheets

REPRINTING

This application claims priority from U.S. Provisional Patent Application No. 60/800,713 filed on May 16, 2006, which is hereby incorporated herein by reference in its entirety.

BACKGROUND

The present exemplary embodiments are related to reprinting. Embodiments include methods and systems for producing reprints of a document with improved consistency relative to a reference printing of the document. For the most part, the methods and systems will be described in regard to color consistency and xerographic or electrophotographic systems. However, embodiments can address other printing issues, such as, for example, image size and gloss and in and between other marking systems, such as, for example, thermal or piezo inkjet printing systems.

In order to take advantage of the economies of —just-in-time—manufacturing, it has become common to produce short runs of documents or print jobs and to —reprint— additional copies of the document or print job on an as-needed basis. This has raised issues regarding consistency between a first or selected reference printing and subsequent reprints of the same document or print job. There are many factors that have an influence on the appearance of, for example, the color of a printed document. For instance, the performance of certain printing system components changes with age. Consumable materials, such as, inks and toners, are replaced with inks or toners from different batches or lots. Worn mechanical components may also be replaced. Print media, such as, paper or velum, may be replaced with paper from different production lots, different manufacturers and be of different grades and quality. All of these factors can influence a perceived consistency between, for example, the appearance of color images in a second or reprint printing of a document as compared to a first or reference printing of that document.

In an effort to achieve a color or appearance requested by a customer, a printing system operator may change or adjust a state of a printing system away from a calibrated or reference state. For example, through an iterative proofing process, a printing system operator may drive a printing system away from a calibrated state in order to reach or produce a color or appearance that cannot be achieved by the printing system in its normal or nominal calibration configuration.

The printing system operator may adjust calibration or transformation information that translates color descriptions into colorant amount or density requests. Additionally, or alternatively, the operator may adjust the state of controls or parameters (i.e., machine or system state data) associated with the printing system, such as, for example, the set points and parameters associated with the imaging process of the printing system.

For instance, some xerographic or electrophotographic systems include a hierarchical control scheme. Note: as used herein, xerographic and electrophotographic are essentially equivalent terms and are both used to refer to powder based and liquid based marking technologies. An illustrative xerographic system includes level 1 controls for maintaining electrophotographic actuators at set points, level 2 controls for selecting set points for the level 1 control loops and level 3 controls for compensating for residual differences between actual and target values of aspects of the electrophotographic process.

For example, in some xerographic systems, available actuators can include cleaning field strength or voltage, development field strength or voltage, imager or laser power and an AC wire voltage associated with some developers. For instance, in some xerographic environments, level 1 control loops include electrostatic volt meters (ESV) for measuring charge voltage generated by charge applied to a photoconductive member. The ESV measure the charge applied in an area of test patches in interdocument or interpage zones (IPZ) of the photo conductor. If measured voltages, such as, for example, a discharge area voltage or a cleaning voltage deviate from set point values, level one control loops adjust these xerographic actuators to return the measured voltage to set point. For example, a charge or bias voltage applied to elements of a developer is adjusted to control a resulting development and/or cleaning field. Additionally, or alternatively, a level 1 control loop may adjust a laser power to return a related discharge field back toward a discharge field set point.

Level 2 control loops can include, for example, infrared densitometers (IRD) or enhanced toner area coverage sensors (ETACS) that can measure the density of toner or colorant applied to or developed on a photoconductive member. If the amount of colorant or toner in a test patch is incorrect or varies from a target density, level 2 control loops generate or select one or more new set points for the actuators of the level one control loops.

Level 3 control loops may also use IRD or ETACS sensors. The IRD or ETACS sensors sense actual densities of level 3 test patches associated with a plurality of target level three test patch densities. This provides level 3 controllers with information about actual tone reproduction curves (TRC) and, therefore, with information about residual error between the actual tone reproduction curve and target tone reproduction curves that could not be addressed by the level two control loops. The level 3 controls use this information to build color correction look up tables which are used in an image path to alter image data to compensate for the residual error and obtain the target TRC behavior in a print of the image data.

An operator may adjust any or all of these elements (i.e., machine or system state data) in an effort to achieve a proof image or printing that is approved by a print job customer.

All of these factors make it difficult for an operator associated with a reprint system (whether the reprint system is the same printing system as the system that printed the first or reference printing of a document or a second printing system) to produce a reprint of a document that has a consistent appearance relative to that of a document produced during the reference printing of the document.

Other factors that can have a bearing on reprint consistency include, but are not limited to, environmental factors, such as, temperature and humidity differences, software and color table updates, and operator-to-operator variations in perception.

Accordingly, there is a desire for systems and methods that simplify the reprint proofing and/or printing process and improve consistency in the appearance of reprints relative to earlier reference prints.

BRIEF DESCRIPTION

A method for producing reprints of a document can include establishing printing system characteristics of a reference printing system used to generate the reference printing of the document in close temporal association with a production of the reference print job and storing the characteristics in association with an identification of the document.

When a determination is made to produce a reprint of the document, the method can further include retrieving the stored printing system characteristics, determining printing system characteristics of a selected reprint printing system in close temporal association with a production of the reprint, generating an image data adjustment mechanism to compensate for a difference between the reference printing system characteristics and the reprint printing system characteristics and producing the reprint with the reprint printing system, in close temporal association with the determination of reprint printing system characteristics, through the use of the generated image adjustment mechanism, thereby improving consistency between the reprint and the reference printing.

Establishing printing system characteristics of the printing systems can include printing analytical test prints with the respective systems in close temporal association with the production of the reference print or reprint.

In some embodiments, printing the analytical test print can include analyzing the document to determine important aspects of the document, selecting analytical test print components that, (when analyzed) will provide information regarding printing system characteristics that have a significant bearing on print consistency specific to the determined important aspects of the document, and including the selected test print components in the printed analytical test print.

In some implementations, analyzing the document can include identifying a position within a page of the document associated with an important aspect of the document, such as a dominant color, memory color, named color and/or a color indicated as important by the system user.

In this regard, selecting test print components in the printed analytical test print can include locating a test patch based on the identified dominant color, memory color, named color or color indicated as important by the system user, at a position in the analytical test print corresponding to the identified position within the page of the document.

A related printing system can include a reference printing system characteristics information receiver, a reprint printing system characteristics information receiver, a compensation calculator and a compensation implementer.

For instance the reference printing system characteristics information receiver can be operative to receive reference printing system characteristics information regarding a reference printing system as it was at a time in close temporal relation to a reference printing of a document produced with the reference printing system and the reprint printing system characteristics information receiver can be operative to receive reprint printing system characteristics information regarding a reprint printing system as it is at a time in close temporal relation to a reprint printing of the reference document to be produced with the reprint printing system.

The compensation calculator can be operative to receive the reference printing system characteristics and reprint system characteristics from the reference printing system characteristics information receiver and the reprint printing system characteristics information receiver and to generate an image data adjustment mechanism to compensate for the difference between the reference printing system characteristics and the reprint printing system characteristics and the compensation implementer can be operative to receive the image adjustment mechanism from the compensation calculator and process document image data in the printing system image path according to the adjustment mechanism.

DETAILED DESCRIPTION

Figure 1:
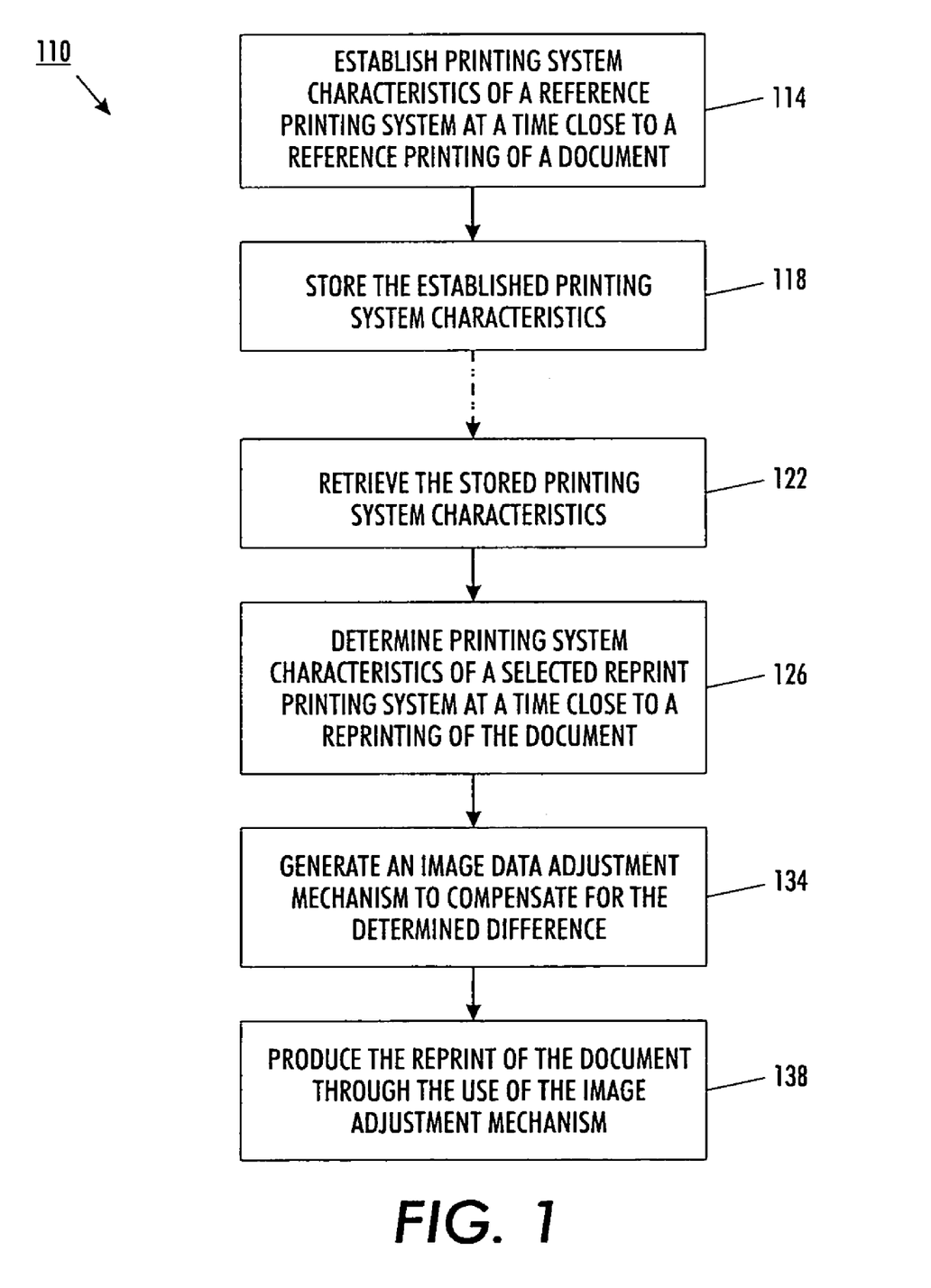
FIG. 1 is a flow diagram summarizing a method of producing reprints of a document.

Referring to FIG. 1, a method 110 for producing reprints of a document or print job with improved consistency can include establishing 114 printing system characteristics of a reference printing system in close temporal association with a production of a reference print job and storing 118 the established 114 printing system characteristics. For example, the established printing system characteristics of the reference printing system are stored in association with an identification of the document or document print job.

At some point in the future, when a determination is made to produce a reprint of the document or print job, the method 110 includes retrieving 122 the stored reference printing system characteristics, determining 126 printing system characteristics of a selected reprint printing system in close temporal association with a production of the reprint, generating 134 an image data adjustment mechanism to compensate for a difference between the determined or established 114 characteristics of the reference printing system and determined 126 characteristics of the reprint printing system and producing 138 the reprint of the document or document print job through the use of the image adjustment mechanism.

Since differences between the reference printing system and the reprint printing system are compensated (134, 138) for, the reprint is produced with improved consistency. That is, the appearance of the reprint more closely matches the appearance of the reference print than would likely otherwise be the case. For instance, the reference printing system is any printing system selected to print a first or other reference printing of a document print job. By reference printing, we mean a printing to which reprints will be compared. It may be the first production printing of the document or any subsequent printing that is selected to be used as a reference or representative preferred print.

The printing system characteristics of the reference printing system can be established 114 by printing an analytical test print (TP) at a point in time close to the point in time at which the reference printing is produced. For instance, the TP can be printed just prior to, during or just after the production of the reference print. For instance, the analytical test print (TP) can be one or more pages containing test patches of various colors or combinations of colorants, such as, for example, cyan (C), magenta (M), yellow (Y) and black (K) colorants. Additionally, the TP can include patches of bare substrate. Alternatively, or additionally, a TP can be printed on portions of main job document prints (i.e., reference prints or reprints). For example color patches associated with a reference or reprint TP can be included in the margins of pages of a document.

The TP can include a standard set of test patches designed to determine printing system characteristics, calibration or/and characterization, across an entire gamut of the printing system.

Alternatively, the TP can be customized in some manner appropriate to the particular print job or document being addressed. For instance, the document can be analyzed manually by a printing system operator or print job customer, automatically by a printing system or a make-ready station or digital front end associated therewith, or by some combination of manual and automated techniques.

For example, important colors in the document can be identified. The definition of important may vary from document to document. For instance, one's perception of consistency between a reference printing and a subsequent reprint is sometimes a function of the consistency of the largest portions or contiguous areas of constant or similar color. For instance, a pictorial image of a person's face might be an example of a large contiguous area of similar color. Business graphics, such as, pie charts and bar graphs, might include relatively large contiguous areas of constant color. Since color differences are more easily perceived when comparing large contiguous areas than they are when comparing small areas, colors or color ranges associated with large contiguous areas of similar color may be determined to be important colors in a particular document. Additionally, or alternatively, named colors, such as, spot colors or colors for which a customer has included metadata naming colors of a portion of a document or print job can be identified as important colors. For instance, in a particular document, consistency might be judged only on a comparison of the color in a business logo. A logo color can be identified as being important by providing the document user with a tool with which the logo or color portion of the logo can be selected and identified as important. Alternatively, metadata naming the color in a logo can be pre-included in an electronic version of the document or print job. The presence of the tag data naming the color of the logo can indicate to an automated document analysis procedure that the named color is important in the particular document being considered.

Additionally, or alternatively, memory colors can be designated as important in a particular document. For example, memory colors include the colors of objects that are immediately recognizable to large groups of people. For instance, people readily recognize certain variations in flesh tones, the color of the sky, the color of leaves and the color of other natural objects, such as, fruits and vegetables. Therefore, in the production of certain documents, one or more memory colors might be designated as, or determined to be, important.

In this regard, as part of establishing 114 system characteristics, a TP can be customized to include color test patches associated with or selected based on colors from the document that are identified as important. The colors requested to be in test patches of the TP can be the same as identified important colors. It can be appropriate to also include such elements as neutral, off neutral, saturated, pastel and/or tone steps of the separations and combinations thereof. It can also be useful to include colors similar to and surrounding the designated important colors or colors of interest The task of getting two printing systems (or a single printing system at two different points in time) to be consistent, match or approach each other's performance with respect to a limited number of colors can be more readily achieved than the task of getting two printing systems (or a single printing system at two points in time) to match or approach each other's performance with regard to the entire color gamuts of the printing systems. Therefore, establishing 114 the color characteristics of a reference printing system primarily with reference to important colors, and then later determining 126 printing system characteristics of a selected reprint printing system and generating 134 an image data adjustment mechanism relative to primarily those important colors can be expected to produce a closer match or better consistency with respect to those important colors than would a similar establishment 114, determination 126 and adjustment mechanism generation 134 relative to an entire printing gamut or much larger number of colors.

Still further customization can be provided by determining positions associated with the important colors. Some printing systems exhibit spatial non-uniformity. That is, a color requested to be printed on one portion of a page may result in a color that appears different than if the same color were requested to be printed on another portion of the page. In such systems, a test patch used to determine or establish 114 the characteristics of a printing system with regard to the color of the test patch can provide misleading information if the information is assumed to be applicable to a different position on the page. In this regard, establishing 114 or determining 126 printing system characteristics can include customizing a TP to include test patches at positions based on, or corresponding to, identified positions of related colors in the associated document.

For instance, if a document page includes a photographic image with a relatively large contiguous area of sky, a TP customized for that document might include an appropriate sky blue test patch at a position in the TP corresponding to at least a portion of a sky blue region in the photographic image. For example, the sky blue test patch can be located at a position in the TP corresponding to the centroid of the sky blue area in the pictorial image. Alternatively, a plurality of appropriately colored sky blue test patches can be included in a customized TP corresponding to a plurality of positions within the sky region or area of the pictorial image. Alternatively, a sky blue test patch can be placed at any convenient position in the TP corresponding to a sky portion of the image. In this example, sky blue (including various shades) might be considered a dominant color. Dominant colors are those that are included in relatively large contiguous areas of the document having a similar color. For instance, if the sky portion of the illustrative photographic image discussed above covers a relatively large portion of the document or of a page of a document, sky blue can be identified as a dominant color in the subject document because the various shades of blue that make up the sky portion of the image are similar and together cover a relatively large contiguous area of the document.

Storing 118 the established reference printing system characteristics can include storing a hard copy or printed copy of the TP. For instance, the TP is stored in association with document or print job identification information indicating that the TP was produced in close temporal association with the production of a reference print job, the appearance of which it may be desired to duplicate or closely approximate in subsequent reprints of the document or print job.

Alternatively, storing 118 the established 114 reference printing system characteristics can include measuring characteristics of the TP and storing the results of those measurements in association with information identifying the document or reference print job. For example, the measurements can be taken with a spectrophotometer, color scan bar or other appropriate characteristics determining device. The characteristics or color sensing device can be inline with the printing system, thereby allowing for automated measurement collection and storage 118. Alternatively, the TP can be manually transferred to an offline measurement station wherein characteristics of the system can be measured or determined and recorded or stored 118 for possible later use.

Storing 118 characteristics of the reference printing system through the use of measurements avoids the issues associated with storing an archival print, such as, fading and print media aging and oxidation. Storing 118 an archival print of the TP allows the TP generated on the reference printing system to be compared to a TP generated with a reprint printing system using the same sensor or measurement device at a time in close temporal association with the rendering or production of the reprints. Therefore, storing 118 and retrieving 122 an archival TP avoids instrument consistency and stability issues associated with taking measurements with different sensors or devices or with the same device at different points in time.

Storing 118 the established 114 characteristics of the reference printing system can also include storing a design or layout of the TP. For instance, where the TP is designed or customized according to the characteristics of the document or print job, that customized design is stored 118 so that the TP design can be used when determining 126 printing system characteristics of the reprint printing system. Standard or default TP designs can also be stored 118 in association with information identifying the document or print job. For example, such TP design storage allows the appropriate TP to be used or considered when determining 126 characteristics of a reprint system.

Any appropriate device can be used for storing 118 the established 114 characteristics of the reference printing system. For instance, a database can be established that is accessible by printing systems via a network connection. Alternatively, information may be stored 118 locally, such as, within the reference printing system. In some embodiments, the TP design, associated measurements, or characteristics determined from measurements, are stored with a digital version of the document or print job, or in association therewith, in a job repository associated with or accessible by the reference printing system.

Storing 118 the TP design can include, for example, storing test patch encoding values (e.g., pre-RIP, post-RIP, pre-rendered and/or post-rendered encoding values) corresponding to the test patches included in the TP.

Storing 118 the established 114 characteristics can include storing spectral measurement values in association with the test patch encoding values. Additionally, actual colorant values, such as, post-processed CMYK values can be stored. Substrate white point spectral measurement values can be stored to allow for substrate or media differences between the reference printing and the reprint printing to be considered. Additionally, measurement conditions, such as, a measurement illumination spectra and measurement geometry information, may also be stored 118. In some embodiments, sensor type and sensor configuration information may also be stored 118.

Subsequently, when there is a desire or when a determination is made to produce a reprint of the document, the stored reference printing system characteristics are retrieved 122 and printing system characteristics of a selected reprint printing system are determined 126. For instance, an identification associated with the document or reference print job is used to access and retrieve 122 stored 118 reference system characteristics information from a database or print job repository. Additionally, or alternatively, an archival reference TP hard copy is retrieved from a file or other TP archive.

The retrieved 122 information may be used to determine an appropriate TP design for use in determining 126 the characteristics of the reprint printing system. For example, the hard copy TP can include text or machine readable glyphs or bar codes indicating the colors or colorant densities that were requested from the reference printing system when each test patch was printed. An operator may use this information to enter or duplicate a TP design for use with the reprint printing system. Alternatively, as indicated above, the TP design can be stored 118 and, therefore, retrieved 122 electronically.

Determining 126 characteristics of the reprint printing system can include requesting that test patches be printed based on the same colors or colorant densities that were requested in the printing of the TP produced by the reference printing system. In some embodiments, determining 126 reprint printing system characteristics can include requesting that the same colors requested in the rendering of the reference TP be produced at positions on the reprint printing system TP corresponding to the positions requested in association with the rendering of the reference TP. In either case, determining 126 the characteristics of the reprint printing system may include rendering a reprint TP that is more elaborate than the reference TP. For instance, compensating 134 for differences between the reference printing system and the reprint printing system may require or benefit from more information about the reprint system than is needed or useful for determining or establishing 114 the characteristics of the reference system. Therefore, determining 126 the characteristics of the reprint system may, for example, include rendering a reprint TP that includes test patches for colors neighboring or surrounding (in color space) the colors included in the reference TP, in addition to, or instead of, the reference TP test patch colors.

In either of these cases, determining 126 printing system characteristics of the selected reprint printing system includes printing a reprint TP through the services of the selected reprint printing system at a time in close temporal association with the printing of the reprint of the document or print job.

As used herein, the phrase —in close temporal association— refers to a point in time close enough to the point in time that a document is printed such that it is unlikely that the characteristics of the printing system would change in any significant way during the time between the document printing and the TP printing, including that the print printing conditions (e.g., substrate, colorants, control settings, photoreceptor degradation and materials aging) are not changed between the document printing and the TP printing. In the case of the reference system TP, the TP can be printed before, during or after the reference printing of the document. Since measurements of the reprint system TP will be used to form the basis of the generated 134 compensation or image adjustment mechanism for the reprint system, it is appropriate to produce the reprint TP prior to the production 138 of the reprints.

Determining 126 the characteristics of the reprint printing system can also include measuring the characteristics of the reprint TP. As with the measurements of the reference TP, the measurements of the reprint TP can include spectral measurement values, actual colorant values and substrate white point spectral measurement values. Measurement condition parameters, such as, measurement illumination spectrum and measurement geometry, may also be determined 126. The measurements can be taken with inline sensors, such as, spectrophotometers and/or color scan bars. Alternatively, the measurements can be made at an offline measurement station.

The measurements of the reprint TP are used to determine 126 characteristics of the reprint printing system. That is, the measurements themselves can be considered to be representative of reprint printing system characteristics. Alternatively, the measurements are used to derive model parameters.

In embodiments where storing 118 the reference printing system characteristics includes storing measurements of the reference printing system TP, those measurements are retrieved 122 and are used as the basis of the compensation 134. In embodiments where storing 118 the established reference printing system characteristics includes storing 118 an archival hard copy or print of the reference TP, the archival print may be retrieved 122. For instance, the archival reference TP may be measured with the same sensor or measuring device as is used to measure the reprint TP. Those measurements can be compared to measurements taken and stored 118 at the time the reference TP was produced. Any significant variation between the two sets of measurements of the reference system TP may trigger exception handling procedures. For instance, the archival print may be further examined for signs of fading or oxidation. Additionally, or alternatively, differences in sensor or measuring devices and/or instrument calibrations associated therewith may be investigated and corrected or compensated for. Alternatively, where prior measurements of the reference TP are not available, retrieving 122 the stored printing system characteristics includes measuring appropriate aspects (e.g., colors) of the retrieved archival reference TP and using those measurements as the retrieved 122 characteristics or calculating characteristic parameters from the measurements.

The reprint system and reference system characteristics (i.e., the respective TP measurements or parameters determined therefrom) are used as the basis for generating 134 an image data adjustment mechanism to compensate for the difference between the reference printing system and the reprint printing system. For instance, the generated 134 image adjustment mechanism is applied to the document image data (e.g. color request data) image to the reprint system so that any difference between the output of the reference system and the output of the reprint system using adjusted document image data, is minimized.

For example, if the input (or color request data) used to generate the reference TP is represented by (cmyk)1, the measurements of the reference TP are represented by (Lab)1, the input (or color request data) used to generate the reference TP ((cmyk)1) is reused to generate the reprint TP, and the measurements of the reprint TP are represented by (Lab)2, then an image data adjustment mechanism can be generated 134 by finding adjusted TP input values (that can be referred to as (cmyk)2) so that (Lab)2 approaches or approximates (Lab)1. For example, an image data adjustment mechanism can be generated using a localized multi-dimensional interpolation to find a transform for mapping or transforming (cmyk)1 to (cmyk)2.

For instance, one or more compensating transforms can be generated 134. For instance, the transforms can be included or inserted in image path processing associated with the reprint printing system. The type of transform used can be selected based on the type of printing system and the point in the image path selected for including the generated 134 image adjustment mechanism.

For example, in some embodiments, the image adjustment mechanism can be comprised of one or more individual colorant compensating tone reproduction curves (TRC) to be included in an image processing path of the reprint printing system. For instance, one compensating TRC can be associated with each colorant used in the printing system. Alternatively, in some embodiments, the image adjustment mechanism can be comprised of multidimensional transforms (e.g., curves, functions or lookup tables) which take into account colorant interactions.

For instance, where the characteristics of the reference printing system and the reprint printing system match except for the reproduction of certain shades of red, a two or three-dimensional TRC or lookup table related to transforming combinations of yellow and magenta, or yellow, magenta and black, colorant values may can be generated 134 and used to produce 138 the reprints of the document.

Still other image data adjustment mechanisms can be generated 134. For instance, in some embodiments or applications, it may be appropriate to generate multi-dimensional CMYK-to-CMYK or L*a*b*-to-L*a*b* transformations. HI-FI printing systems may include additional or other colorants. In those systems, still higher dimensional transformations may be appropriate. In some embodiments or applications, the generated 134 image data adjustment mechanism may be included as an adjustment to values associated with a transformation already included in an image path of a printing system. For example, values in an L*a*b* to CMYK transformation table or coefficients of an L*a*b*-to-CMYK transformation equation or matrix, normally included in an image processing path, can be adjusted to incorporate the generated 134 image data adjustment mechanism.

One method for generating 134 an image data adjustment mechanism, referred to as moving matrix interpolation, can be described as follows:

Given a link-list inverse printer model for a reprint printing system, which consists of the data set: $(C_i, M_i, Y_i, K_i, L_i, a_1, b_1)$ i=1,2,..., N the optimal (C, M, Y, K) that gives the closest colorimetric value (L,a,b) in the weighted least-square (WLS) sense in color difference $\Delta E$ can be found by first finding a transformation matrix $T_2$:Lab→CMYK by solving the WLS problem in Eq. (1) below. Then the optimal CMYK combination, that produces the closest color to (L,a,b), can be estimated by Eq. (2) below.

$$T_2 = \underset{U}{\mathrm{argmin}} \left( \sum_{i=1}^{N} w_i \left\| \begin{bmatrix} C_i \\ M_i \\ Y_i \\ K_i \end{bmatrix} - U \cdot [L_i \; a_i \; b_i \; 1] \right\|_2^2 \right) \quad \& \quad (1)$$

$$w_i = \frac{1}{((L_i - L)^2 + (a_i - a)^2 + (b_i - b)^2)^\alpha + \varepsilon}$$

$$\begin{bmatrix} C \\ M \\ Y \\ K \end{bmatrix} = T_2 \cdot [L \; a \; b \; 1] \quad (2)$$

Here, $\alpha$ & $\varepsilon$ are used to control the smoothness and localization of the printer model. $T_2$ can be a 4×4 matrix, which transforms (L,a,b)+offsets to (C,M,Y,K).

Note that the transformation matrix $T_2$ can vary depending on the value of each intended Lab (location in CIELAB space, thus the name moving matrix) and needs to be recalculated each time a new intended Lab is given.

Similarly, moving matrix interpolation can be used to build a forward printer model, which can be described as follows:

Given a link-list forward printer model for reference printing system, which consists of the data set $(C_i, M_i, Y_i, K_i, L_i, a_i, b_i)$ i=1,2,..., M the predicted colorimetric value (L, a, b) for printing the color patch (C, M, Y, K) can be determined by solving the WLS problem in Eq. (3) below, where a transformation matrix $T_1$:CMYK→Lab is first identified that would give the minimal errors in the weighted least-square (WLS) sense in $\Delta E$. Then the predicted Lab can be estimated by Eq. (4) below.

$$T_1 = \underset{U}{\mathrm{argmin}} \left( \sum_{i=1}^{M} w_i \left\| \begin{bmatrix} L_i \\ a_i \\ b_i \end{bmatrix} - U \cdot [C_i \; M_i \; Y_i \; K_i] \right\|_2^2 \right) \quad \& \quad (3)$$

$$w_i = \frac{1}{((C_i - C)^2 + (M_i - M)^2 + (Y_i - Y)^2 + (K_i - K)^2)^\alpha + \varepsilon}$$

$$\begin{bmatrix} L \\ a \\ b \end{bmatrix} = T_1 \cdot [C \; M \; Y \; K] \quad (4)$$

Here again, $\alpha$ & $\varepsilon$ are used to control the smoothness and localization of the printer model. $T_1$ can be a 3×4 matrix, which transforms (C,M,Y,K) to (L,a,b).

Note again that the transformation matrix $T_1$ can vary depending on the value of each intended CMYK and needs to be recalculated each time a new intended CMYK is given.

To generate 134 the image adjustment mechanism, the mapping $T_1$:CMYK→Lab can be used to characterize the reference system and the mapping $T_2$:Lab→CMYK can be used to characterize the reprint system. The mappings can be built with different test-patterns. However, as indicated above some commonality between the TP is useful. A third mapping $T_3$:CMYK→CMYK (i.e. the generated 134 image adjustment mechanism) can be stored as a form of LUT, or can be calculated on the fly to preserve the localization by concatenating the two multi-dimensional interpolation schemes $T_1$ & $T_2$.

Whatever form the image data adjustment mechanism takes, the reprint of the document or print job is produced 138 through the use of the image adjustment mechanism, thereby improving the consistency of the reprint with respect to the reference print.

In some embodiments, establishing 114 and storing 118 printing system characteristics of the reference printing system can include recording system state information regarding the reference printing system. For example, halftone screens, print mode selections, system component configurations, system component lot numbers, system software configuration and system color table state information can be recorded. For instance, in xerographic systems, settings associated with the level 1, level 2 and/or level 3 controls can be recorded. Lot number information with regard to replaceable components, such as, xerographic replaceable units (including, for example, corotron or scorotron components) may be recorded. Where such component changes are associated with changes in system performance, lot number information may be associated with color correction information. System software configuration and color table state information may provide useful hints for setting up a reprint system in a manner similar to the way the reference printing system was set up at the time of the reference printing.

Figure 2:
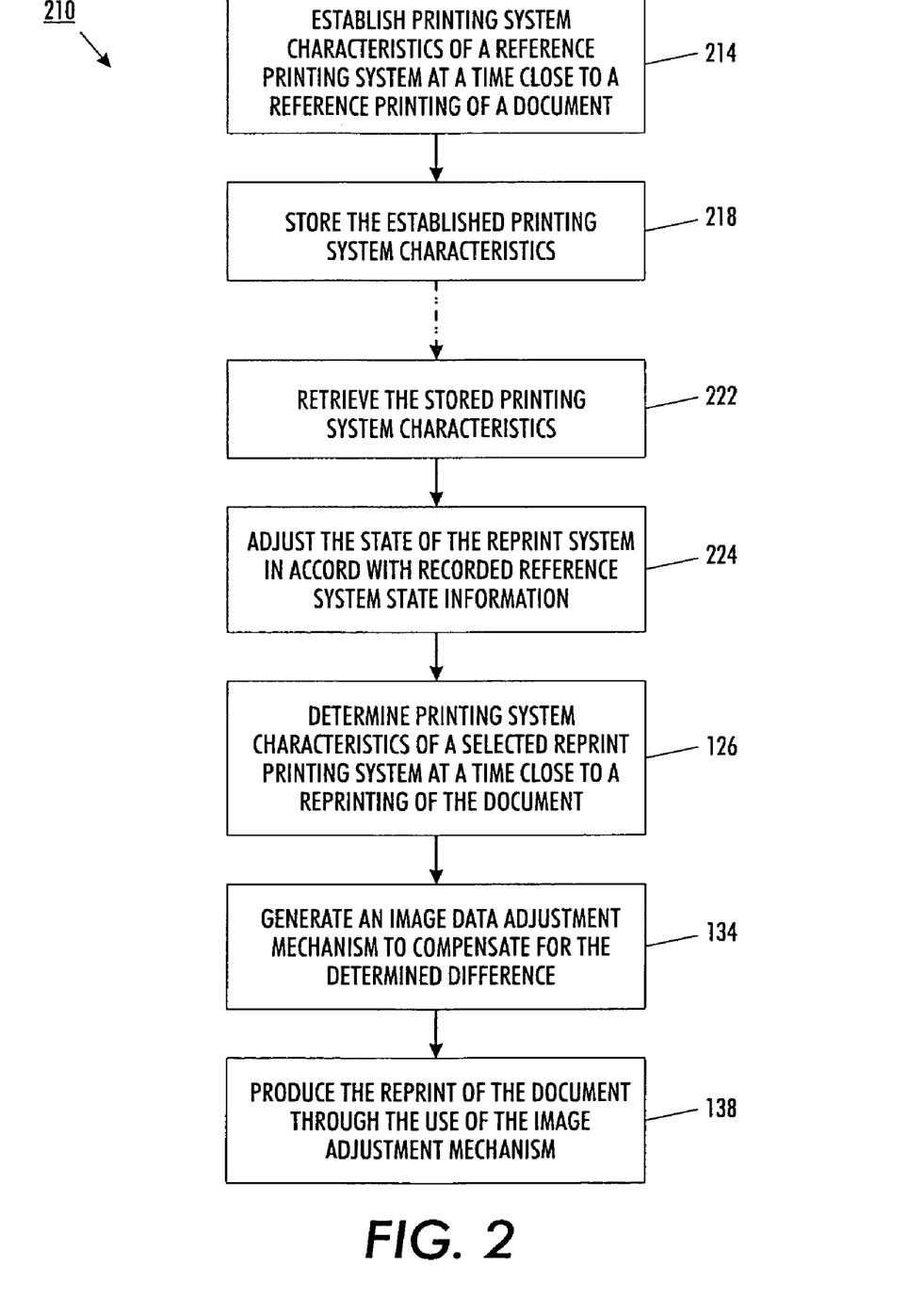
FIG. 2 is a flow diagram summarizing an embodiment of the method of FIG. 1.

Therefore, as illustrated in FIG. 2, some embodiments 210 of a method for producing reprints of a document or print job with improved consistency include establishing 214 printing system characteristics of a reference printing system and storing 218 the established printing system characteristics wherein the establishing 214 and storing 218 include determining system state information including, but not limited to, any or all of the types of state information discussed above, and recording the determined state information. Such embodiments further include retrieving 222 the stored printing system characteristics, wherein the retrieving includes retrieving the recorded system state information, and adjusting 224 the state of the reprint system in accord with the recorded reference system state information.

The adjustment 224 can include duplicating settings, such as, halftone screens, print mode selections, system software configuration, system color table state and system control settings, such as, the level 1, level 2 or level 3 control settings discussed above to match, or approximate, the related settings of the reference printing system as they were stored 218 at or about the time of the reference printing. Additionally, or alternatively, adjusting 224 the state of the reprint system can include replacing a component of the reprint system with a component from the same lot as that used in the reference printing system, or compensating for differences therebetween. The remainder of the method 210 includes determining 126, generating 134 and producing 138 elements similar to those described with reference to FIG. 1.

Figure 3:
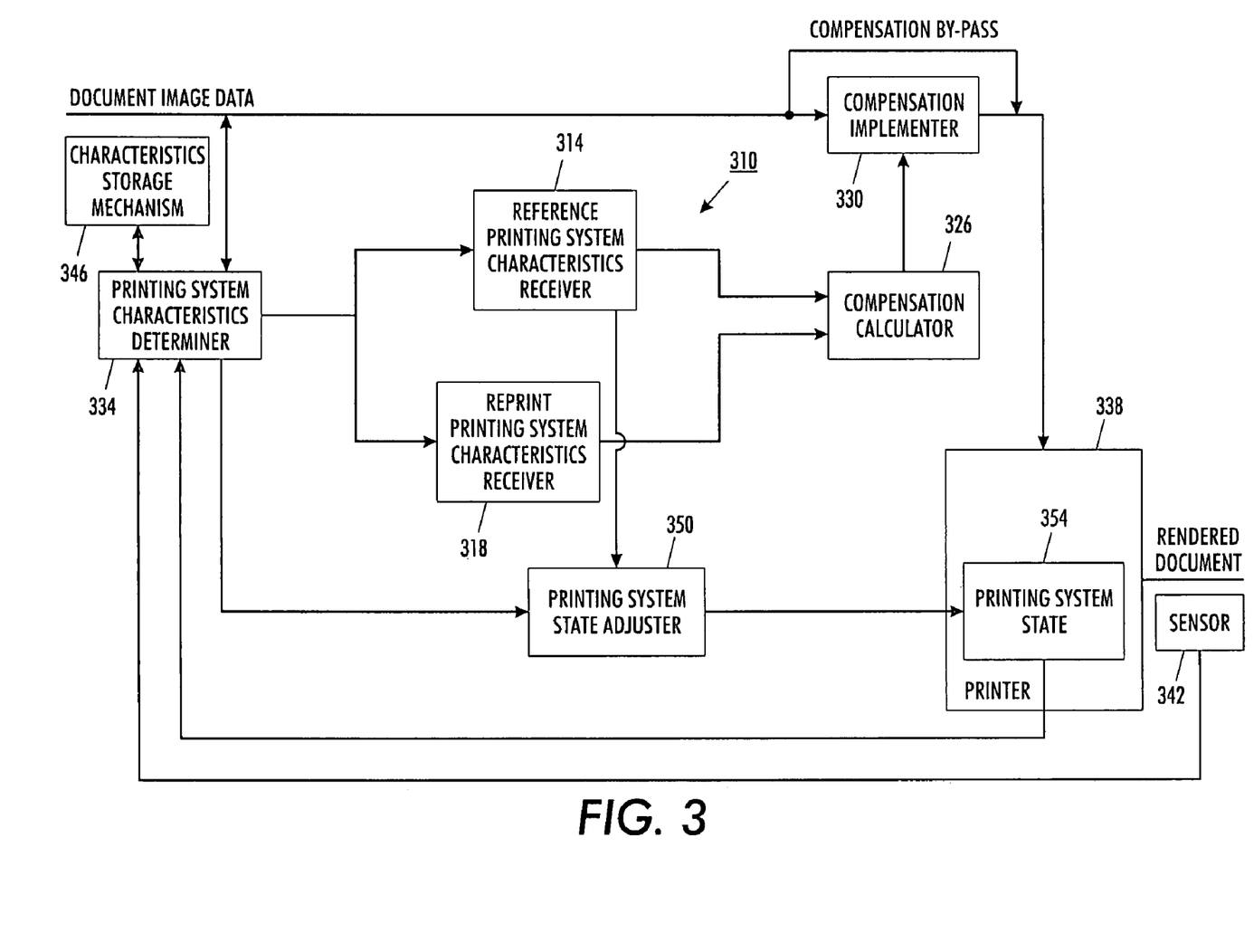
FIG. 3 is a block diagram of a printing system that can be used to perform the methods of FIGS. 1 and 2.

Referring to FIG. 3, an illustrative printing system 310 that can be used to perform the method 110 for producing reprints of a document or print job can include a reference printing system characteristics receiver 314, a reprint printing system characteristics receiver 318, a compensation calculator 326 and a compensation implementer 330.

For instance, the reference printing system characteristics receiver 314 can be operative to receive reference printing system characteristics information regarding a referenced printing system as it was at a time in close temporal relation to a reference printing of a document produced with the reference printing system. For instance, the reference printing system characteristics receiver 314 can retrieve 122 reference printing system characteristics information by communicating with a user interface and receiving characteristics information manually entered by a system operator. Alternatively, characteristics information is retrieved 122 from computer media, such as, a hard drive, floppy disk or CD or DVD ROM, or via a network connection to the reference printing system, a characteristics measurement station, or to a database storing reference printing system characteristics information.

The reprint printing system characteristics receiver 318 can be operative to receive reprint printing system characteristics information regarding a reprint printing system as it is at a time in close temporal relation to a reprint printing of the document. In embodiments where, for example, the reprint printing system characteristics are determined 126 offline, the reprint printing system characteristics information receiver 318 can receive the characteristics information via a user interface from a system operator or via computer media or a network connection in a manner similar to that described above with respect to the reference characteristics receiver 314.

Alternatively, the printing system 310 can include a printing system characteristics determiner 334. For instance, if the printing system 310 is a reprint printing system, the printing system characteristics determiner 334 can be operative to retrieve 122 the stored printing system characteristics and to determine 126 the reprint printing system characteristics information and deliver the determined information to the reprint system characteristics receiver 318. If the printing system 310 is the reference printing system, then the characteristics determiner 334 can be operative to establish 114 the reference printing system characteristics and can be operative to store 118 them. If the printing system is both the reference system and the reprint system, the characteristics determiner 334 establishes 114 the reference printing characteristics and is associated with the retrieval 122 of the established 114 characteristics when they are needed in association with the production of a reprint of the document.

For instance, the characteristics determiner 334 may be operative to generate and print an analytical test print (TP). For example, the characteristics determiner 334 delivers image data regarding describing the TP to an image path of the system 310 (bypassing the compensation implementer 330) and controls a printer 338 to print a version of the TP. If the system 310 is being operated as a reference printing system, the TP (or image data describing the TP) can be stored 118 by being placed in a file or TP archive in association with some identification of the document or print job. If the system 310 is being operated as a reprint system or if it is desired to store established 114 reference printer characteristics as TP measurements or as parameters based on TP measurements, the TP is analyzed by a sensor 342 or other measurement device. Signals or measurements from the sensor 342 are received by the characteristics determiner 334 and are correlated with the test patch colors requested in the generated TP.

That is, the characteristics determiner 334 measures characteristics of the analytical test print by controlling the sensor 342 (and/or alignment or positioning equipment associated therewith) to take measurements of the various test patches included in the TP and records information regarding those measurements in association with information regarding the colors requested to be included in the test patches. If the system 310 is operating as a reference printing system, the measurements, or parameters calculated from the measurements, can be stored 118 by the characteristics determiner 334 in a characteristics storage mechanism 346. For instance, the storage mechanism 346 can be a file or database included on a computer media such as a hard drive or CD or DVD optical disk installed local to the system 310 or accessed remotely over a communications network.

The TP generated by the characteristics determiner 334 can be a standard or default TP hard coded into software associated with the characteristics determiner 334 or stored in a read only memory or read writable memory that can receive updated or revised default or standard TP patterns. In these instances, generating the TP refers to accessing and relaying or generating image data from this stored pattern information.

In some embodiments, the characteristics determiner 334 is operative to analyze the document to determine important aspects of the document, select TP components that, when analyzed, will provide information regarding printing system characteristics that have a significant bearing on print consistency regarding the determined important aspects of the document, and include the selected TP components in the TP.

For example, as discussed above in reference to FIG. 1, if the document includes a photographic image including a significant portion of sky, after analyzing the document, the characteristics determiner 334 may select a sky blue test patch for inclusion in the TP. This assumes that the system 310 is being operated as a reference printing system. If the system 310 is being operated as a reprint printing system, the characteristics determiner 334 receives design or layout information regarding the TP used by the reference printing system, either by scanning the reference printing system TP (e.g., with the sensor 342) to determine TP design or layout information, receiving layout information from a system operator, or by accessing a reference TP storage mechanism (e.g., 346) to retrieve TP design or layout information.

Analyzing the document to determine important aspects can include, for example, identifying one or more dominant colors in the document, as described above. Additionally, or alternatively, the characteristics determiner 334 can identify memory colors included in the document, identify named colors within the document (e.g., by reading metadata or tags associated with the document and/or by identifying colors within a document that a system user indicates are important).

In some embodiments, the characteristics determiner 334 is operative to identify positions within a page of a document associated with the important aspects or important and/or dominant colors of the document and to use that location information in locating test patches within a customized TP. For example, if an illustrative photographic image is included on a page of a document such that a sky blue portion is located along the top edge of the page from about the right corner of the page to about the center of the page and extending down the page about one inch on the right hand side and about two inches near the center of the page, then the characteristics determiner 334 might locate a sky blue test patch at a position within the TP corresponding to the position of the sky portion of the image. For example, the test patch can be located at a position corresponding to an approximate centroid of the sky blue portion. That is, for example, the sky blue test patch might be located at a position halfway between the right edge and centerline of a sheet of the TP and the center of the test patch can be located, for example, three quarters of an inch down from the top edge of the TP sheet. Alternatively, the characteristics determiner 334 can locate several sky blue test patches of the same or different shades corresponding to several shades of sky blue included in the image and locate those test patches at positions in the TP corresponding to positions of those shades within the image on the page of the document.

As indicated above, and, for example, as controlled by a system operator, the characteristics determiner 334 can print the TPs in close temporal association with the production of respective reference or reprint document print jobs. When the system 310 includes a printing system characteristics determiner 334, one or both of the characteristics receivers 314, 318 may receive the characteristics from the characteristics determiner 334.

Whatever their source, the characteristics receivers 314, 318 deliver the printing system characteristics to the compensation calculator 326.

The compensation calculator 326 generates an image data adjustment mechanism to compensate for the determined difference as described above. For example, the compensation calculator 326 generates 134 one or more transforms. For instance, the compensation calculator 326 generates one or more 1, 2, 3, 4 or more dimensional transforms, such as, single colorant TRCs or multi-dimensional lookup tables or compensation equations that take into account colorant interactions. For instance, in some applications, the compensation calculator 326 may generate a compensating CMYK-to-CMYK compensating transform. In other embodiments, it may be appropriate for the compensation calculator 326 to generate an L*a*b*-L*a*b* transform. The calculated compensation or transformation (i.e., the image adjustment mechanism) is delivered to the compensation implementer 330.

For example, the compensation implementer 330 is a procedure added to the image path which maps incoming document image data to output compensated document image data according to the transformation or compensation received from the compensation calculator 326. Alternatively, the compensation implementer 330 uses the information received from the compensation calculator to modify an existing transformation or image processing function included in the image path. For example, the image path may include an L*a*b*-to-CMYK transformation that is part of typical image processing. In some embodiments, the compensation implementer 330 modifies values in transformation equations or transformation lookup tables according to the compensation information received from the compensation calculator 326.

When the reprint print job is produced 138, document image data is processed through the compensation provided by the compensation implementer 330 and delivered to the associated printer 338, thereby compensating for differences between the reference printing system and the reprint printing system and producing 138 reprints with improved consistency relative to the reference printing.

Some embodiments also include a printing system state adjuster 350. For instance, the printing system state adjuster can be operative to adjust the state of the reprint printing system in accordance with state information determined from the reference printing system. For example, such state information can include halftone screens, print mode selections, system component configuration, system component lot numbers, system software configuration, system color table states and print engine state parameters, such as, for example, the level 1, level 2 and level 3 control loop set points discussed above with reference to electrophotographic or xerographic systems.

For instance, in systems that include a printing system state adjuster 350, a reference printing system characteristics receiver (e.g., 314) or printing system characteristics determiner 334 can be operative to receive or retrieve 222 such state information regarding the reference printing system. To be compatible with this feature, the reference printing system includes a printing system characteristics determiner (e.g., 334) that is operative to retrieve or establish 114, 214 printing system state information 354 and store 218 the established 214 state information in association with identification information related to the document. The reference system state information usefully describes the state of the reference printing system at or about the time of the production of the reference system TP.

In reprint systems that include a printing system characteristics determiner (e.g., 334), the characteristics determiner may retrieve 222 the stored printing system characteristics (instead of the characteristics receiver (e.g., 314)) in a manner similar to that described with reference to retrieving 122 TP measurement based reference system characteristics. The characteristics determiner may deliver the system state information to a reference system characteristics receiver (e.g., 314). Alternatively, the printing system characteristics determiner may provide the reference system state information directly to the printing system state adjuster 350.

In systems that do not include a characteristics determiner, a reference printing system characteristics receiver (e.g., 314) may receive or retrieve 222 the stored printing system state characteristics in a manner similar to that described with reference to receiving or retrieving 122 the stored TP measurement based reference system characteristics information and deliver that information to the printing system state adjuster 350.

The state adjuster 350 adjusts 224 the state of the reprint system in accord with the recorded or received reference printing system state information.

If the reference printing system and the reprint printing system are the same device, or if the reference system and the reprint system are different devices of the same type (e.g., model), adjusting 224 the state of the reprint system can include ensuring that the state parameters of the reprint system are set to the same values as were used in the reference printing system. For example, level 1, level 2 and level 3 control set points may be reset to the set point values that were used in the reference system during the printing of the reference TP. Additionally, or alternatively, color table values may be reset to the values used in the reference system. With regard to lot numbers, the system operator can be directed to install related components from the same or similar lot. Alternatively, the operator or the printing system state adjuster 350 may apply a compensation to account for differences between a component lot number in the reference system and the lot associated with an installed component in the reprint system.

When the reference printing system and the reprint printing system are of significantly different models or even different printing technologies, the state adjuster 350 may be able to transform state information determined from the state of the reference printing system into values that have meaning in the reprint printing system in an effort to place the reprint printing system in a state which will minimize the characteristics differences compensated for by the compensation calculator 326 and compensation implementer 330.

The various components described with reference to the system 310 (e.g., 314, 318, 326, 330, 334, 346 and 350) can be implemented in various combinations of hardware and software including, but not limited to, program memory, data memory, computer storage medias, micro-processors, micro-controllers, digital signal processors and application specific ICs (ASICs).

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. The claims can encompass embodiments in hardware, software or a combination thereof. The word "printer" as used herein encompasses any apparatus, such as, a digital copier, bookmaking machine, facsimile machine, multi-function machine, etc., which performs a print outputting function for any purpose. Although a color printing apparatus has been described, the claims can encompass embodiments that print in black and white or monochrome.

The invention claimed is:

1. A method for producing reprints of a document with improved consistency relative to a reference printing of the document, the method comprising:
    establishing printing system characteristics of a reference printing system used to generate the reference printing of the document in close temporal association with a production of the reference print job;
    storing the established printing system characteristics in association with an identification of the document;
    when a determination is made to produce a reprint of the document;
    retrieving the stored printing system characteristics based on the identification of the document;
    determining printing system characteristics of a selected reprint printing system in close temporal association with a production of the reprint;
    generating an image data adjustment mechanism to compensate for a difference between the reference printing system characteristics and the reprint printing system characteristics; and
    producing the reprint with the reprint printing system, in close temporal association with the determination of reprint printing system characteristics, through the use of the generated image adjustment mechanism, thereby improving consistency between the reprint and the reference printing.

2. The method of claim 1 wherein establishing printing system characteristics of the reference printing system comprises:
    printing an analytical test print with the reference printing system in close temporal association with the production of the reference printing of the document.

3. The method of claim 2 wherein determining printing system characteristics of the reprint printing system comprises:
    printing an analytical test print with the reprint printing system in close temporal association with the production of the reprint printing of the document; and
    measuring characteristics of the analytical test print printed with the reprint printing system, thereby generating reprint system characteristics measurements.

4. The method of claim 3 wherein generating an image data adjustment mechanism comprises:

determining characteristics of the analytical test print printed with the reference printing system, thereby determining reference system measurements; and generating an image data adjustment mechanism based on the reference system and the reprint system measurements.

5. The method of claim 2 wherein storing the established printing system characteristics comprises at least one of storing the analytical test print and storing data from a measurement of the analytical test print.

6. The method of claim 2 wherein printing the analytical test print comprises:

analyzing the document to determine important aspects of the document;

selecting analytical test print components that provide information regarding printing system characteristics that have a significant bearing on print consistency relative to the determined important aspects of the document; and including the selected test print components in the printed analytical test print.

7. The method of claim 6 wherein analyzing the document comprises at least one of: identifying at least one dominant color based on an analysis of contiguous areas of the document having similar color, identifying at least one memory color included in the document, identifying at least one named color within the document, and identifying at least one color within the document that a system user indicates is important.

8. The method of claim 7 wherein analyzing the document comprises identifying a position within a page of the document associated with at least one of the at least one identified dominant color, memory color, named color and/or color indicated as important by the system user.

9. The method of claim 8 wherein including the selected test print components in the printed analytical test print comprises:

locating a test patch based on the identified dominant colors, memory colors, named colors, or colors indicated as important by the system user, at a position in the analytical test print corresponding to the identified position within the page of the document.

10. The method of claim 1 wherein generating the image data adjustment mechanism comprises:

generating at least one of: a CMYK-to-CMYK transform, a L*a*b*-to-L*a*b* transform, at least one one dimensional transform, at least one two dimensional transform, at least one three dimensional transform, and at least one four dimensional transform.

11. The method of claim 1 wherein establishing printing system characteristics of the reference printing system comprises:

recording at least one of: a halftone screen selection, a print mode selection, a system component configuration, a system component lot number, a system software configuration, a system color table state, a xerographic system setting, and a marking system setting.

12. The method of claim 11 further comprising:

adjusting a state of the reprint printing system in accordance with at least one of: the recorded halftone screen selection, print mode selection, system component configuration, system component lot number, system software configuration, and/or a system color table state or xerographic or marking system setting.

13. A printing system comprising:

a reference printing system characteristics information receiver that is operative to receive reference printing system characteristics information regarding a reference printing system as it was at a time in close temporal relation to a reference printing of a document produced with the reference printing system;

a reprint printing system characteristics information receiver that is operative to receive reprint printing system characteristics information regarding a reprint printing system as it is at a time in close temporal relation to a reprint printing of the reference document to be produced with the reprint printing system;

a compensation calculator that is operative to generate an image data adjustment mechanism to compensate for a difference between the reference printing system characteristics and the reprint printing system characteristics; and a compensation implementer that is operative to receive the image adjustment mechanism from the compensation calculator and process document image data in the printing system image path according to the adjustment mechanism, thereby improving consistency between reprints and a reference printing.

14. The printing system of claim 13 further comprising:

a reference printing system characteristics information storage mechanism that is operative to store the reference printing system characteristics information in association with identification information regarding the reference print of the document.

15. The printing system of claim 13 further comprising:

a printing system characteristics determiner that is operative to determine at least one of: the reference printing system characteristics information and the reprint printing system characteristics information, and to deliver the determined information to at least one of: the reference printing system characteristics information receiver and the reprint printing system characteristics information receiver.

16. The printing system of claim 15 wherein the printing system characteristics determiner is operative to at least one of: generate and print an analytical test print with the reference printing system in close temporal association with the production of the reference printing of the document and generate and print an analytical test print with the reprint printing system in close temporal association with the production of the reprint printing of the document.

17. The printing system of claim 16 wherein the printing system characteristics determiner is operative to bypass the compensation implementer in order to generate and print analytical test prints.

18. The printing system of claim 16 wherein the printing system characteristics determiner is operative to analyze the document to determine important aspects of the document, select analytical test print components that provide information regarding printing system characteristics that have a significant bearing on print consistency relative to the determined important aspects of the document, and include the selected test print components in the analytical test print.

19. The printing system of claim 18 wherein the printing system characteristics determiner is operative to analyze the document by at least one of: identifying at least one dominant color based on an analysis of contiguous areas of the document having similar color, identifying at least one memory color included in the document, identifying at least one named color within the document, and identifying at least one color within the document that a system user indicates is important.

20. The printing system of claim 18 wherein the printing system characteristics determiner is operative to analyze the document by identifying a position within a page of the document associated with at least one of the identified dominant color, memory color, named color and/or color indicated as important by the system user.

21. The printing system of claim 20 wherein the printing system characteristics determiner is operative to locate a test patch based on the at least one identified dominant color, memory color, named color, or color indicated as important by the system user, at a position in the analytical test print corresponding to the identified position within the page of the document.

22. The printing system of claim 15 wherein the printing system characteristics determiner is operative to at least one of: measure characteristics of an analytical test print printed with the reference printing system, thereby generating a reference system measurement and measure characteristics of an analytical test print printed with the reprint printing system, thereby generating a reprint system measurement.

23. The printing system of claim 13 wherein the compensation calculator is operative to generate the image data adjustment mechanism by generating at least one of: a CMYK-to-CMYK transform, a L*a*b*-to-L*a*b* transform, at least one one dimensional transform, at least one two dimensional transform, at least one three dimensional transform and at least one four dimensional transform.

24. The printing system of claim 13 wherein at least one of the reference printing system characteristics receiver and a printing system characteristics determiner are operative to receive printing system state information including at least one of: a reference halftone screen selection, a reference print mode selection, a reference system component configuration, a reference system component lot number, a reference system software configuration, a reference system color table state, a reference system xerographic system setting, and a reference marking system setting.

25. The printing system of claim 24 further comprising at least one of:
a printing system state adjuster that is operative to adjust a state of the reprint printing system in accordance with printing system state information including at least one of: the reference halftone screen selection, reference print mode selection, reference system component configuration, reference system component lot number, reference system software configuration, reference system color table state, reference system xerographic system setting, electrophotographic system setting, or marking system setting received by at least one of: the reference printing system characteristics receiver and the printing system characteristics determiner.

26. The printing system of claim 13 wherein the printing system is operative to determine the image adjustment mechanism, process document image data in the printing system image path according to the adjustment mechanism, and thereby produce a reprinted document with improved consistency between the reprint and a reference printing, such that no manual or system operator intervention is required.

\* \* \* \* \*